United States Patent
Yao et al.

(10) Patent No.: US 10,084,710 B2
(45) Date of Patent: Sep. 25, 2018

(54) DATA PROCESSING METHOD OF NOC WITHOUT BUFFER AND NOC ELECTRONIC ELEMENT

(71) Applicant: HUAWEI TECHNOLOGIES CO., LTD., Shenzhen, Guangdong (CN)

(72) Inventors: Zhicheng Yao, Beijing (CN); Xiufeng Sui, Beijing (CN); Rui Ren, Beijing (CN); Jiuyue Ma, Beijing (CN); Yungang Bao, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 196 days.

(21) Appl. No.: 14/721,730

(22) Filed: May 26, 2015

(65) Prior Publication Data
US 2016/0028634 A1    Jan. 28, 2016

(30) Foreign Application Priority Data
Jul. 28, 2014  (CN) .......................... 2014 1 0364429

(51) Int. Cl.
*H04L 12/851* (2013.01)
*H04L 12/64* (2006.01)
(Continued)

(52) U.S. Cl.
CPC ............ *H04L 47/24* (2013.01); *H04L 5/0053* (2013.01); *H04L 12/6418* (2013.01); *H04L 47/11* (2013.01)

(58) Field of Classification Search
CPC ....... H04L 47/24; H04L 47/11; H04L 5/0053; H04L 12/6418
See application file for complete search history.

(56) References Cited

U.S. PATENT DOCUMENTS 9,379,983 B2 *  6/2016  Yoshida ................. H04L 12/403
9,473,415 B2 * 10/2016  Kumar .................... H04L 47/19
(Continued)

FOREIGN PATENT DOCUMENTS

CN    101420380 A    4/2009
CN    101808032 A    8/2010
(Continued)

OTHER PUBLICATIONS

Yao et al., "QBLESS: A Case for QoS-Aware Bufferless NoCs," 2014 IEEE 22$^{nd}$ International Symposium on Quality of Service, pp. 93-98, Institute of Electical and Electronics Engineers, New York, New York (2014).
(Continued)

*Primary Examiner* — Tauqir Hussain
*Assistant Examiner* — Steve Lin
(74) *Attorney, Agent, or Firm* — Leydig, Voit & Mayer, Ltd.

(57) ABSTRACT

A data processing method for an NOC without buffer and an NOC electronic element are provided. The method includes: receiving multiple packets by a routing node in one processing period, where the plurality of packets need to be transmitted to a same forwarding port; acquiring priority information of the multiple packets and determining priority levels of the packets based on the priority information, where for each packet, the priority information includes time length information of the packet and program priority information of a program corresponding to the packet, and the time length information of the packet represents a time period during which the packet is remained in the NOC; and forwarding a packet having a highest priority through the forwarding port. The method and the NOC electronic element are applied to data processing for the NOC without buffer.

16 Claims, 5 Drawing Sheets

(51) Int. Cl.
*H04L 5/00* (2006.01)
*H04L 12/801* (2013.01)

(56) References Cited

U.S. PATENT DOCUMENTS

| | | | |
|---|---|---|---|
| 2008/0069094 A1* | 3/2008 | Lee ..................... | H04L 45/302 370/389 |
| 2010/0202449 A1 | 8/2010 | Moscibroda et al. | |
| 2013/0148506 A1* | 6/2013 | Lea ..................... | H04L 47/32 370/236 |
| 2013/0194927 A1 | 8/2013 | Yamaguchi et al. | |
| 2014/0156929 A1* | 6/2014 | Falsafi ................ | G06F 12/0813 711/122 |
| 2014/0198638 A1* | 7/2014 | Campbell ............. | H04L 47/12 370/230 |
| 2015/0188829 A1* | 7/2015 | Satpathy ............. | H04L 47/2458 370/236 |

FOREIGN PATENT DOCUMENTS

| | | |
|---|---|---|
| CN | 102394829 A | 3/2012 |
| KR | 100785472 B1 | 12/2007 |
| WO | WO 2012132263 A1 | 10/2012 |

OTHER PUBLICATIONS

Nychis et al., "On-Chip Network from a Networking Perspective: Congestion and Scalability in Many-Core Interconnects," Proceedings of the ACM SIGCOMM 2012 conference on Applications, technologies, architectures, and protocols for computer communication, pp. 407-418, ACM, New York, New York (2012).

Joven et al., "Exploring Programming Model-driven QoS Support for NoC-based Platforms," 2010 IEEE/ACM/IFIP International Conference on Hardware/Software Codesign and System Synthesis (CODES+ISSS), pp. 65-74, Institute of Electical and Electronics Engineers, New York, New York (Oct. 24-29, 2010).

Zhang et al. "QBNoC: QoS-aware bufferless NoC architecture," Microelectronics Journal, vol. 45, Issue 6, pp. 751-758, Elsevier Ltd. (Jun. 2014).

Mingtao Zhang, "Analysis of NoC Routing Algorithm Based on Two-Dimensional Mesh; Research on Routing Algorithms for Bufferless Network on Chip," Computer Application Technology, Harbin Engineering University, (2013).

* cited by examiner

DATA PROCESSING METHOD OF NOC WITHOUT BUFFER AND NOC ELECTRONIC ELEMENT

CROSS-REFERENCE TO RELATED APPLICATION

This application claims priority to Chinese Patent Application No. 201410364429.9, filed on Jul. 28, 2014, which is hereby incorporated by reference in its entirety.

TECHNICAL FIELD

The present invention relates to the technical field of integrated circuit, and in particular, to a data processing method of an NOC without buffer and an NOC electronic element.

BACKGROUND

As development of semiconductor technologies, integrated circuit (IC) designer can integrate more and more complicated functions to a single wafer, and system on a chip (SOC) comes into being as the IC gradually changes into an integrated system. In the narrow sense, the SOC is an integration of electronic information systems; while in the generalized sense, the SOC is a small microelectronic system. In the SOC, digital-analog hybrid circuits are integrated on the single wafer. The SOC includes various function modules such as an embedded core, a storage, a dedicated function module, an input/output interface module, etc. In addition, model algorithm, chip structure, hierarchical circuits and even device design are comprehensively taken into consideration in the SOC, to implement, with one single chip, all functions of a whole computer.

As the function modules get elaborated and complicated, the quantity of data links for information communication among the function modules is greatly increased, which results in the difficulty in SOC design and an increasing system consumption of the SOC. Around the year 1999, several research groups proposed a new integrated circuit architecture, Network On Chip (NOC). A basic concept of the NOC lies in that, computer network technologies are migrated into chip design to thoroughly overcome disadvantages of the SOC architecture.

The NOC may be defined as a multiprocessor system in which network-based communications are achieved with one single chip. The NOC includes routing nodes and communication nodes. The routing node is for fulfilling general computation tasks, while the communication mode is in charge of data communications between routing nodes. A communication approach for a distributed computer system is used in a network of the communication nodes, and communication tasks are fulfilled by using routing and packet switching technologies.

Obviously, the router is a core component of the NOC, which is for forwarding and transmitting packets. A conventional router mainly includes components such as a virtual channel, a data buffer, a priority arbiter, a crossbar switch, etc. In recent researches, an NOC without virtual channel and data buffer, called NOC without buffer, is proposed to improve performance of the NOC.

Conventionally, the NOC without buffer has no function of buffering; hence, when the NOC without buffer forwards packets, the routing node needs to transmit a received packet before receiving a next packet, no matter whether the received packet is to be transmitted through an expected forwarding port. In this way, in a case that multiple packets compete for ports, only one packet can be allocated with its expected port while all other packets are transmitted to unexpected ports, and accordingly, deflections take place on the packets transmitted to unexpected ports. In addition, in a case that a new packet needs to be injected into network through the forwarding port of the NOC without buffer, the new packet cannot be injected immediately if there is no free injection port in the router, resulting in a starvation. Hence, in a case that in the NOC without buffer there are multiple packets to be transmitted, the multiple packets would be transmitted randomly; consequently, a packet having a high priority is deflected, and the NOC without buffer cannot ensure the performance of a program having a high priority.

SUMMARY

A data processing method for a network on chip, NOC, without buffer and an NOC electronic element are provided according to embodiments of the invention, to improve performance of a program having a high priority by decreasing a ratio that the packets having a high program priority are deflected.

Technical solutions according to the embodiments of the invention are described as follows.

In a first aspect, a data processing method for an NOC without buffer is provided, the method is applied to the NOC electronic element without buffer, and the method includes:

receiving multiple packets by a routing node in one processing period, where the multiple packets need to be transmitted to a same forwarding port;

acquiring priority information of the multiple packets and determining priority levels of the packets based on the priority information, where for each packet, the priority information includes time length information of the packet and program priority information of a program corresponding to the packet, and the time length information of the packet represents a time period during which the packet is remained in the NOC, and forwarding a packet having a highest priority through the forwarding port.

In a first implementation of the first aspect, the process of acquiring priority information of the multiple packets and determining priority levels of the packets based on the priority information includes:

acquiring the priority information of each packet and a pre-stored priority threshold; and determining the priority level of each packet based on the priority information of the packet and the priority threshold.

In a second implementation of the first aspect, before the process of acquiring priority information of the multiple packets and determining priority levels of the packets based on the priority information, the method further includes:

acquiring, when a packet enters a first one of the routing nodes in the NOC, priority information corresponding to the packet from a register of a CPU corresponding to the first one of the routing nodes, and writing the priority information corresponding to the packet into a head of the packet; and the process of acquiring priority information of the multiple packets and determining priority levels of the packets based on the priority information includes:

reading the priority information corresponding to the packets from the heads of the packets, and obtaining the priority levels of the packets based on the priority information of the packets.

In a third implementation of the first aspect, in combination with the first aspect or the first implementation of the first aspect or the second implementation of the first aspect, after a process of determining the packet having the highest priority among the multiple packets to be transmitted to the same forwarding port, the method further includes:

forwarding other packets in addition to the packet having the highest priority through other forwarding ports in addition to the forwarding port.

In a second aspect, a data processing method for an NOC without buffer is provided. The method is applied to the NOC electronic element without buffer, and the method includes:

acquiring node information of each routing node in the NOC electronic element, where the node information includes a starving ratio of the routing node, a quantity of instructions per flit, IPF, for each packet of a program corresponding to a packet currently injected into the routing node, and program priority information indicating a priority of the currently injected packet;

if the NOC electronic element encounters congestion, calculating, based on the IPFs and the program priority information of the packets currently injected into respective routing nodes, injection restriction ratios exerted by respective routing nodes for the programs corresponding to the currently injected packets, where the injection restriction ratio is a percentage of the program corresponding to the currently injected packet, which is restricted by the routing node from being injected into the routing node; and allocating the injection restriction ratios, exerted by respective routing nodes for the programs corresponding to the currently injected packets, to corresponding routing nodes, where each routing node restricts, based on the corresponding injection restriction ratio, the program corresponding to the currently injected packet from being injected into the routing node.

In a first implementation of the second aspect, the process of calculating, based on the IPFs and the program priority information of the packets currently injected into respective routing nodes, injection restriction ratios exerted by the respective routing nodes for the programs corresponding to the currently injected packets includes:

determining, based on the IPFs and the program priority information of the packets currently injected into the respective routing nodes and an injection restriction ratio formula, the injection restriction ratios exerted by the respective routing nodes for the programs corresponding to the currently injected packets, where the injection restriction ratio formula is $$T = \max\left(\delta, \frac{\lambda}{\alpha * IPF + \beta * \text{Priority}}\right),$$

where T represents the injection restriction ratio, Priority represents a program priority of the currently injected packet, and $\delta$, $\alpha$, $\beta$, $\gamma$ are constants.

In a second implementation of the second aspect, in combination with the second aspect or the first implementation of the second aspect or the second implementation of the second aspect, the method further includes:

comparing, for each routing node, the starving ratio of the routing node with a starving ratio threshold corresponding to the routing node, to determine whether the routing node encounters congestion, and determining that the NOC electronic element encounters congestion, if any routing node in the NOC electronic element encounters congestion.

In a third aspect, an NOC electronic element is provided. The NOC electronic element includes at least one routing node, and each routing node includes a storage, a processor, a switching unit, an input port and an output port, the storage is configured to store a routing table, where a path along which a packet reaches a destination is recorded in the routing table, the processor is configured to, receive, in one processing period, multiple packets needing to be transmitted to a same forwarding port, acquire priority information of the multiple packets and determine priority levels of the multiple packets based on the priority information, and transmit a packet having a highest priority through the forwarding port; where for each packet, the priority information includes time length information of the packet and program priority information of a program corresponding to the packet, and the time length information of the packet represents a time period during which the packet is remained in the NOC.

In a first implementation of the third aspect, the storage is further configured to store a priority threshold, and when the processor acquires the priority information of the multiple packets and determines the priority levels of the multiple packets based on the priority information, the processor is further configured to acquire the priority information of packets, acquire the priority threshold from the storage, and obtain the priority levels of the packets based on the priority information of the packets and the priority threshold.

In a second implementation of the third aspect, the processor is further configured to, acquire, when a packet enters a first one of the at least one routing node in the NOC, the priority information corresponding to the packet from a register of a CPU corresponding to the first one of the at least one routing node, and write the priority information corresponding to the packet into a head of the packet, and when the processor acquires the priority information of the multiple packets and determines the priority levels of the multiple packets based on the priority information, the processor is further configured to read the priority information corresponding to each packet from the head of the packet, and obtain the priority level of the packet based on the priority information of the packet.

In a third implementation of the third aspect, in combination with the third aspect or the first implementation of the third aspect or the second implementation of the third aspect, the processor is further configured to forward other packets in addition to the packet having the highest priority through other forwarding ports in addition to the forwarding port.

In a fourth aspect, an NOC electronic element is provided, which includes at least one routing node and a data processor, and each routing node includes an injection port and at least one forwarding port, the data processor is configured to acquire node information of each routing node in the NOC electronic element from the routing node in the NOC electronic element, where the node information includes a starving ratio of the routing node, a quantity of instructions per flit, IPF, for each packet of a program corresponding to a packet currently injected into the routing node, and program priority information indicating a priority of the currently injected packet, the data processor is further configured to, if the NOC electronic element encounters congestion, calculate, based on the IPFs and the program priority information of the packets currently injected into respective routing nodes, injection restriction ratios exerted by the respective routing nodes for the programs corresponding to the currently injected packets, where the injection restriction ratio is a percentage of the program corresponding to the currently injected packet, which is restricted by the routing node from being injected into the routing node, the data processor is further configured to allocate the injection restriction ratios, exerted by respective routing nodes for the programs corresponding to the currently injected packets, to corresponding routing nodes, and each routing node is configured to restrict, based on the corresponding injection restriction ratio allocated by the data processor, the program corresponding to the currently injected packet from being injected into the routing node.

In a first implementation of the fourth aspect, when the data processor calculates, based on the IPFs and the program priority information of the packets currently injected into respective routing nodes, the injection restriction ratios exerted by the respective routing nodes for the programs corresponding to the currently injected packets, the data processor is further configured to determine, based on the IPFs and the program priority information of the packets currently injected into the respective routing nodes and an injection restriction ratio formula, the injection restriction ratios exerted by the respective routing nodes for the programs corresponding to the currently injected packets, where the injection restriction ratio formula is $$T = \max\left(\delta, \frac{\lambda}{\alpha * IPF + \beta * \text{Priority}}\right),$$

where T represents the injection restriction ratio, Priority represents a program priority of the currently injected packet, and $\delta$, $\alpha$, $\beta$, $\gamma$ are constants.

In a second implementation of the fourth aspect, in combination with the fourth aspect or the first implementation of the fourth aspect, the data processor is further configured to compare, for each routing node, the starving ratio of the routing node with a starving ratio threshold corresponding to the routing node, to determine whether the routing node encounters congestion, and to determine that the NOC electronic element encounters congestion if any routing node in the NOC electronic element encounters congestion.

In a third implementation of the fourth aspect, in combination with the fourth aspect or the first implementation of the fourth aspect or the second implementation of the fourth aspect, the node information of each routing node in the NOC electronic element is stored in a register of the routing node.

In a fifth aspect, an NOC electronic element is provided, which includes at least one routing node and a data processor, where each routing node includes an injection port and at least one forwarding port, the routing node in the NOC electronic element is configured to, receive, in one processing period, multiple packets needing to be transmitted to a same forwarding port; acquire priority information of packets and determine priority levels of the packets based on the priority information; and transmit a packet having a highest priority through the forwarding port, where the priority information includes time length information of the packet and program priority information of a program corresponding to the packet, the time length information of the packet represents a time period during which the packet is remained in the NOC;

the data processor is configured to acquire node information of each routing node in the NOC electronic element from the routing node in the NOC electronic element, where the node information includes a starving ratio of the routing node, an IPF for each packet of a program corresponding to a packet currently injected into the routing node and program priority information of the program, the program priority information is used to indicate a priority of the currently injected packet; and if the NOC electronic element encounters congestion, the data processor is further configured to calculate, based on the IPFs and the program priority information of the packets currently injected into respective routing nodes, injection restriction ratios exerted by respective routing nodes for the programs corresponding to the currently injected packets, where the injection restriction ratio is a percentage of the program corresponding to the currently injected packet, which is restricted by the routing node from being injected into the routing node, and the data processor is further configured allocate the injection restriction ratios, exerted by the respective routing nodes for the programs corresponding to the currently injected packets, to corresponding routing nodes;

each routing node in the NOC electronic element is further configured to restrict, based on the corresponding injection restriction ratio allocated by the data processor, the program corresponding to the currently injected packet from being injected into the routing node.

In the data processing method for the NOC without buffer and the NOC electronic element according to the embodiments of the invention, the routing node receives, in one processing period, multiple packets needing to be transmitted to a same forwarding port, acquires the priority information of the packets and determines the priority levels of the packets based on the priority information, where the priority information includes the time length information of the packet and the program priority information of the program corresponding to the packet, the time length information of the packet represents the time period during which the packet is remained in the NOC; and the packet having the highest priority is forwarded through the forwarding port. Hence, a packet having a high priority may have bigger chance of victory when the packet is injected into a routing node through the forwarding port, the time period during which a packet having a high program priority is remained in the NOC without buffer is shortened, and further, performance of a program having a high priority is improved by decreasing a ratio that the packets having the high program priority are deflected.

BRIEF DESCRIPTION OF THE DRAWINGS

To make technical solutions according to the embodiments of the invention or according to conventional technology better understood by those skilled in the art, the drawings used in the disclosure will be briefly described in the following.

DETAILED DESCRIPTION

Technical solutions according to embodiments of the invention are described clearly and completely hereinafter in conjunction with drawings in the embodiments of the invention. Obviously, the described embodiments are merely a part of rather than all of the embodiments of the invention.

Figure 1:
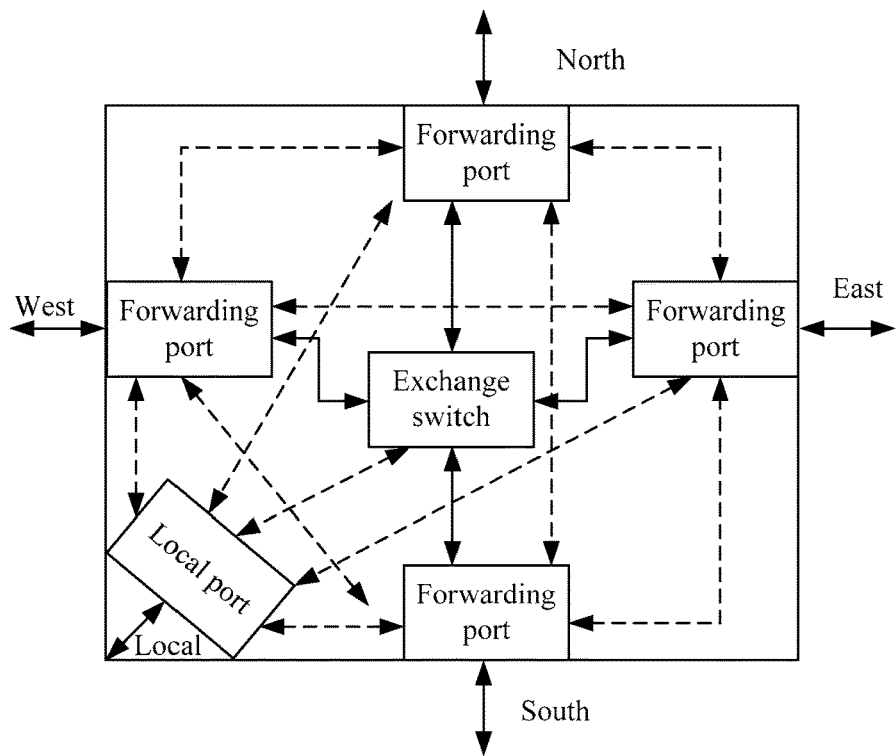
FIG. 1 is a schematic diagram of ports of a routing node of an NOC electronic element according to an embodiment of the invention.

The embodiments of the invention are applied to a network on chip (NOC) without buffer. The NOC without buffer is a kind of NOC without virtual channel and data buffer. This kind of NOC electronic element includes routing nodes and communication nodes, where the routing node is configured to fulfill general computation tasks, while the communication mode is in charge of data communications between routing nodes. As shown in FIG. 1, which is a schematic diagram of ports of a routing node, the routing node includes an exchange switch, a local port (i.e., an injection port), and forwarding ports at four directions of east, south, west and north. The exchange switch is configured to exchange data among respective port links within the routing node. The local port is configured to forward packets transmitted by the routing node and packets received by the routing node. The four forwarding ports are connected to other routing nodes and are configured for packets transmission between the routing node and other routing nodes. And since the forwarding ports at the four directions of east, south, west and north having a same routing structure, the forwarding port at each direction includes the following components: a virtual channel controller, an input virtual channel buffer module, a routing decoder and a request arbiter.

Figure 2:
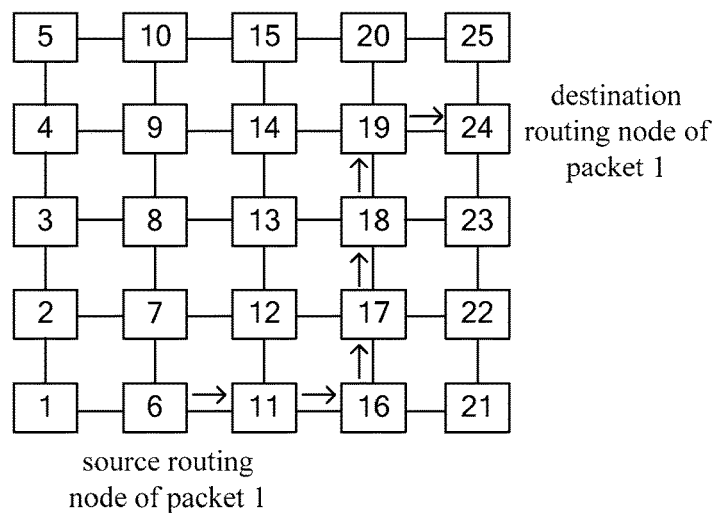
FIG. 2 is a schematic data transmission diagram showing a routing of a packet among routing nodes according to an embodiment of the invention.

Specifically, after a packet enters the routing node through a local port of a source routing node based on an ID of the source routing node, the packet may be transferred, based on an ID of a destination routing node carried in this packet, toward the destination routing node, and the packet is output from the routing node through a local port of the destination routing node. As an example, as shown in FIG. 2, which is a schematic transmission diagram of the routing of a packet among routing nodes, for a packet 1 which takes a routing node 6 as the source routing node and takes a routing node 24 as the destination routing node, a detailed transmission process is described as follows: after the packet 1 is injected through the injection port of the routing node 6, the packet 1 is forwarded to a routing node 11 through a forwarding port at the east of the routing node 6; after the routing node 11 received the packet, the routing node 11 may forward the packet, through a forwarding port at the east of the routing node 11, to a routing node 16; the forwarding continues in this way until the packet is forwarded to the routing node 24; after receiving the packet, the routing node 24 may transmit the packet.

Based on the above, a new data processing method for an NOC without buffer and an NOC electronic element are provided according to embodiments of the invention.

Figure 3:
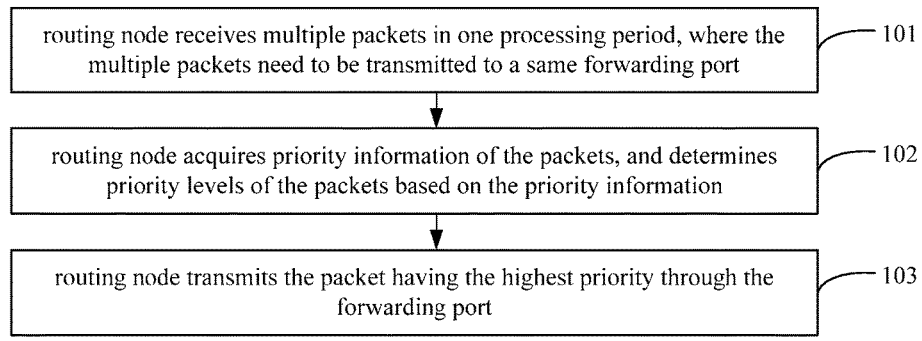
FIG. 3 is a schematic flow chart of a data processing method for an NOC without buffer according to an embodiment of the invention.

A data processing method for an NOC without buffer is provided according to an embodiment of the invention. The method is applied to an NOC electronic element including at least one routing node. Each routing node includes an injection port and at least one forwarding port. As shown in FIG. 3, the data processing method for the NOC without buffer specifically includes the following steps.

In a step 101, the routing node receives multiple packets in one processing period, where the multiple packets need to be transmitted to a same forwarding port.

In a step 102, the routing node acquires priority information of the packets, and determines priority levels of the packets based on the priority information.

The priority information includes time length information of the packet and program priority information of a program corresponding to the packet. The program priority information of the program corresponding to the packet is descriptive of a priority of the program corresponding to the packet. The time length information of the packet represents a time period during which the packet is remained in the NOC without buffer, i.e., the time period during which the packet stays after entering the NOC without buffer. If the time length information of the packet represents a longer period, it is indicated that the time period during which the packet stays in the NOC without buffer is longer, and it is necessary to transmit the packet as soon as possible to avoid the packet from occupying resource. Hence, if the time length information of a packet represents a longer period, a priority level corresponding to the packet is higher. Exemplarily, the priority information of the packet may be stored as head information in a head of the packet. The head of the packet includes, but not limited to, ID of a destination routing node, ID of a source routing node and a data type of the packet.

Exemplarily, the routing node receives, in one processing period, multiple packets occupying a same forwarding port, respectively obtains the time length information of each packet and the program priority information of the program corresponding to each packet, then calculates the priority level of each packet based on the time length information of each packet and the program priority information of the program corresponding to each packet, and finally, determines a packet having a highest priority based on the calculated priority levels of respective packets and transmits the packet having the highest priority from the forwarding port.

Optionally, in a case that the program priority information of the packet is obtained from the head information of the packet, before the step 102, the method further includes the following step.

In step 102a, when a packet enters a first one of the routing nodes in the NOC, the routing node acquires priority information corresponding to the packet from a register of a CPU corresponding to the first one of the routing nodes, and writes the priority information corresponding to the packet into the head of the packet.

Further, based on the step 102a, the step 102 specifically includes: reading, by the routing node, the priority information corresponding to the packet from the head of the packet, and obtaining the priority level of the packet based on the priority information of the packet.

Exemplarily, when any packet is injected into any routing node of the NOC electronic element through an injection port, the routing node reads the priority information corresponding to the packet and writes the priority information into the head of the packet, where the priority information corresponding to the packet is pre-stored in a register of a central procession unit (CPU for short) corresponding to the routing node. The priority information pre-stored in the register of the CPU corresponding to the routing node is pre-configured by a system or a user based on practical application requirements. Exemplarily, the register of the routing node is a QoS (Quality of Service) register in the CPU corresponding to the routing node.

In a step 103, the routing node transmits the packet having the highest priority through the forwarding port.

Optionally, after the step 102, the following step may be further included.

In step 102b, the routing node transmits other packets in addition to the packet having the highest priority through other forwarding ports in addition to the forwarding port.

Exemplarily, in a case that there are multiple packets are transmitted to a same forwarding port in one processing period of the routing node, the routing node calculates the priority level of each packet based on the priority information of each packet, and allocates ports for the multiple packets based on the priority levels. The packet having the highest priority is directly allocated with the forwarding port, i.e., the packet having the highest priority is transmitted through the forwarding port, while other packets having lower priorities are deflected, i.e., other packets are respectively transmitted through other forwarding ports.

Optionally, the step 102 specifically includes the following steps.

In a step 102c1, the routing node obtains the priority information of the packets and a pre-stored priority threshold.

The priority threshold, handicap, is a fixed parameter, and is determined mainly based on a size of an NOC network (for example, the NOC having 64 cores corresponds to a handicap with one value, and the NOC having 32 cores corresponds to a handicap with another value). After the size of the NOC network is determined, a value of the handicap is called as a fixed value and may not change. In addition, the handicap is stored in the register of the CPU corresponding to the routing node. When the routing node needs to calculate the priority level of each packet based on the priority threshold, the priority threshold may be read from the register of the CPU corresponding to the routing node.

In a step 102c2, the routing node determines the priority levels of the packets based on the priority information of the packets and the priority threshold.

Exemplarily, after the routing node obtains the program priority information of each packet, the time length information age of each packet, and the handicap of the NOC, the routing node may calculate the priority level of each packet with formula 1 or formula 2; here, the handicap is mainly used to amplify differences between respective packets, to raise a packet having a high priority to higher level, and to lower a packet having a low priority to lower level; specifically, formula 1 and formula 2 are shown as follows:

$$F=age+Priority*handicap \quad \text{formula 1}$$

$$F=age*Priority*handicap \quad \text{formula 2}$$

It should be noted that, the formula 1 and formula 2 may be modified and set based on practical application situations. The formula 1 and formula 2 herein are merely exemplary, and detailed calculation formulas are not limited herein.

Specifically, when the routing node allocates forwarding ports for the respective packets based on the calculated priority levels of the respective packets, the packet having the highest priority passes through the forwarding port directly, i.e., the packet having the highest priority is forwarded through the forwarding port, while other packets having lower priorities are deflected, i.e., the other packets are forwarded through other forwarding ports. For the deflected packets, values of age of the packets may be increased as the packets are deflected to be allocated to other forwarding ports, and accordingly, the packets are more advantageous in a next competition for the forwarding port.

In the data processing method for the NOC without buffer according to the embodiment of the invention, the routing node receives, in one processing period, multiple packets needing to be transmitted to a same forwarding port, acquires the priority information of the packets and determines the priority levels of the packets based on the priority information, where the priority information includes the time length information of the packet and the program priority information of the program corresponding to the packet, the time length information of the packet represents the time period during which the packet is remained in the NOC; and the packet having the highest priority is forwarded through the forwarding port. Hence, a packet having a high priority may have bigger chance of victory when the packet is injected into a routing node through the forwarding port, the time period during which a packet having a high program priority is remained in the NOC without buffer is shortened, and further, performance of a program having a high priority is improved by decreasing a ratio that the packets having the high program priority are deflected.

Figure 4:
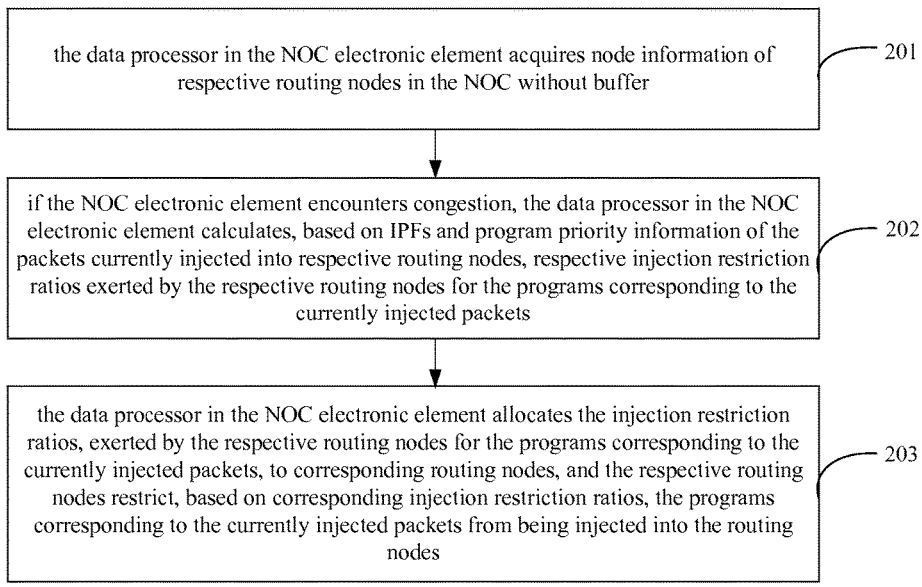
FIG. 4 is a schematic flow chart of a data processing method for an NOC without buffer according to an embodiment of the invention.

A data processing method for an NOC without buffer is provided according to an embodiment of the invention. The method is applied to an NOC electronic element. The NOC electronic element includes at least one routing node and a data processor. As shown in FIG. 4, the data processing method for the NOC without buffer specifically includes the following steps.

In a step 201, the data processor in the NOC electronic element acquires node information of respective routing nodes in the NOC without buffer.

Specifically, the data processor according to the embodiment of the invention may be a centralized controller in the NOC, or may be a CPU corresponding to any routing node in the NOC, or may be an independent calculation unit. The NOC in the embodiment of the invention includes at least one routing node, and each routing node includes an injection port configured to inject packets and multiple forwarding ports configured to forward packets to a network. The node information of the routing node, described in the embodiment of the invention, includes but not limited to: a starving ratio of the routing node, an IPF (Instruction Per flit, a quantity of instructions corresponding to each packet) and program priority information of a program corresponding to a packet currently injected into the routing node. Specifically, the program priority information is used to indicate a priority of the currently injected packet, the starving ratio of the routing node is a ratio of a starving period of the routing node over one NOC data period; and the starving period is a period during which a starvation takes place in the routing node. It should be noted that, the starving ratio is usually used to reflect a congestion level of the NOC without buffer.

Exemplarily, if the IPF of the program corresponding to the currently injected packet is high, it is indicated that a large quantity of instructions are required to be executed by the routing node to inject packets of the program, to which the currently injected packet corresponds, into the routing node, and it is further indicated that the program corresponding to the currently injected packet has high sensitivity to network latency. If the IPF of the program corresponding to the currently injected packet is low, it is indicated that a small quantity of instructions are required to be executed by the routing node to inject packets of the program, to which the currently injected packet corresponds, into the routing node, and it is further indicated that the program corresponding to the currently injected packet has low sensitivity to network latency.

Specifically, when the data processor in the NOC electronic element acquires the program priority information of the program corresponding to the packet currently injected into the routing node, the program priority information of the program corresponding to the currently injected packet may be acquired by directly analyzing a head of the currently injected packet, or the program priority information of the program corresponding to the packet may be acquired directly from a register of the routing node, based on an ID of a destination routing node, a source address and so on stored in head information of the packet.

In a step 202, if the NOC electronic element encounters congestion, the data processor in the NOC electronic element calculates, based on IPFs and program priority information of the packets currently injected into respective routing nodes, respective injection restriction ratios exerted by the respective routing nodes for the programs corresponding to the currently injected packets.

The injection restriction ratio is a percentage of the program corresponding to the currently injected packet, which is restricted by the routing node from being injected into the routing node, i.e., a proportion of packets of the program corresponding to the packet currently injected into the routing node, which are restricted from being injected into the routing node. In addition, the injection restriction ratio is used to represent a proportion of packets of a CPU corresponding to the routing node to be injected in a next period, that is to say, for each packet transmitted by the CPU corresponding to the routing node, whether to be injected or not needs to be determined based on the injection restriction ratio, where an injection process of each packet is a stochastic process.

Optionally, a step 202 specifically includes the following step:

In a step 202a, the data processor in the NOC electronic element determines, based on the IPFs and program priority information of the packets currently injected into the respective routing nodes and an injection restriction ratio formula, the injection restriction ratios exerted by the respective routing nodes for the programs corresponding to the currently injected packets.

The injection restriction ratio formula is $$T = \max\left(\delta, \frac{\lambda}{\alpha * IPF + \beta * \text{Priority}}\right),$$

where T represents the injection restriction ratio, Priority represents the program priority of the currently injected packet, and $\delta, \alpha, \beta, \gamma$ are constants.

Exemplarily, if the NOC electronic element encounters congestion, the data processor in the NOC electronic element exerts, based on acquired IPFs and program priority information of the programs corresponding to the packets currently injected into the respective routing nodes and the injection restriction ratio formula, restrictions of different extents on the packets to be injected into the respective routing nodes in a preset period. Specifically, for a program having a priority lower than a first preset threshold, and a program having an IPF lower than a second preset threshold (i.e., a program which is not sensitive to a network latency), a corresponding routing node exerts a high injection restriction ratio for the program to be injected into the routing node, where the program corresponds to the currently injected packet. In other words, a program having a low priority and a program having a low sensitivity to network latency are restricted from being injected into the routing node; hence, the quantity of packets in the NOC electronic element is decreased, and accordingly, the congestion in the NOC electronic element is alleviated. While for a program having a priority higher than the first preset threshold, the corresponding routing node exerts a low injection restriction ratio for the program, which corresponds to the currently injected packet, to be injected into the routing node; hence, a program having a high priority is provided with a bigger chance to be successfully injected into the routing node, the program having the high priority is guaranteed with a minimal occurrence of starvation and deflection, and accordingly, time period during which the packet is remained in the NOC electronic element is directly shortened and the congestion of the NOC electronic element is reduced.

Specifically, it can be known from the above injection restriction ration formula that, there is a negative correlation between the IPF and the program priority information of the program corresponding to the packet currently injected into each routing node; hence, the injection restriction ratio for a program having a priority higher than the first preset threshold is lower than that for a program having a priority lower than the first preset threshold and that for a program having an IPF lower than the second preset threshold. It should be further noted that, $\delta$ is a minimal threshold set to prevent the calculated injection restriction ratio from being too small.

Optionally, before the step 202, the following step is further included:

In a step 202b, the data processor in the NOC electronic element compares for each routing node the starving ratio of the routing node with a starving ratio threshold corresponding to the routing node, to determine whether the routing node encounters congestion.

If any routing node in the NOC electronic element encounters congestion, it is determined that the NOC without buffer encounters congestion.

If congestion takes place in any routing node in the NOC electronic element, it is determined that the NOC without buffer encounters congestion. Specifically, when the data processor in the NOC electronic element performs a congestion determination for each routing node, the starving ratio of the routing node is compared with a starving ratio threshold preset for the routing node, and congestion is considered to take place on the routing node if the starving ratio of the routing node exceeds the starving ratio threshold preset for the routing node. It should be noted that the respective routing nodes correspond to different starving ratio thresholds. The starving ratio thresholds for the each routing node is acquired by the routing node based on a combination of the starving ratio of the routing node, the IPF and program priority information of the program corresponding to the currently injected packet, and a current application scenario.

In a step 203, the data processor in the NOC electronic element allocates the injection restriction ratios, exerted by the respective routing nodes for the programs corresponding to the currently injected packets, to corresponding routing nodes, and the respective routing nodes restrict, based on corresponding injection restriction ratios, the programs corresponding to the currently injected packets from being injected into the routing nodes.

Specifically, after the data processor in the NOC electronic element calculates the injection restriction ratios exerted by the respective routing nodes for the packets, the injection restriction ratios corresponding to the respective routing nodes are allocated to corresponding routing nodes. After receiving the injection restriction ratio, each routing node may perform, based on received injection restriction ratio, injection determination for respective packets of the program corresponding to the currently injected packet. For example, in a case that the injection restriction ratio for a certain routing node is 50%, the routing node restricts, based on the injection restriction ratio of 50%, that 50% of the packets of the program corresponding to the packet currently injected into the routing node from being injected into the routing node.

In the data processing method for the NOC without buffer according to the embodiment of the invention, if the NOC electronic element encounters congestion, the data processor in the NOC electronic element calculates, based on the IPFs and program priority information of the packets currently injected into the respective routing nodes, in the node information of the respective routing nodes, the injection restriction ratios exerted by the respective routing nodes for the programs corresponding to the currently injected packets. Specifically, the injection restriction ratio for the program having the priority higher than the first preset threshold is lower than those for the program having the priority lower than the first preset threshold and the program having the IPF lower than the second preset threshold. Then, the injection restriction ratios corresponding to the respective routing nodes are respectively allocated to corresponding routing nodes, and each routing node determines, based on the corresponding injection restriction ratio, whether to inject the respective packets of the program corresponding to the currently injected packet into the routing node. Hence, when a routing node performs restriction, based on the allocated injection restriction ratio, on the packets of the program corresponding to the currently injected packet, packets of a program having a high priority are guaranteed to be injected into a routing node from a forwarding port as soon as possible since the injection restriction ratio corresponding to the program having the high priority is rather low. Hence, the packets of the program having the high priority are deflected for decreased number of times, an overall performance of the program having the high priority is improved, the transmission efficiency of the packets of the program having the high priority is improved, and the congestion of the NOC without buffer is alleviated.

It should be noted that, the process that in one processing period the routing node allocates the forwarding ports for the respective packets transmitted to a same forwarding port based on the program priorities of the packets, as described in the embodiment corresponding to FIG. 2, and a process that in congestion of the NOC electronic element the data processor in the NOC electronic element exerts restrictions of different extents on the programs corresponding to the packets injected into the respective routing nodes, based on the congestion situation of the NOC electronic element and the program priorities of the programs, as described in the embodiment corresponding to FIG. 3, may be implemented in a same embodiment.

Figure 5:
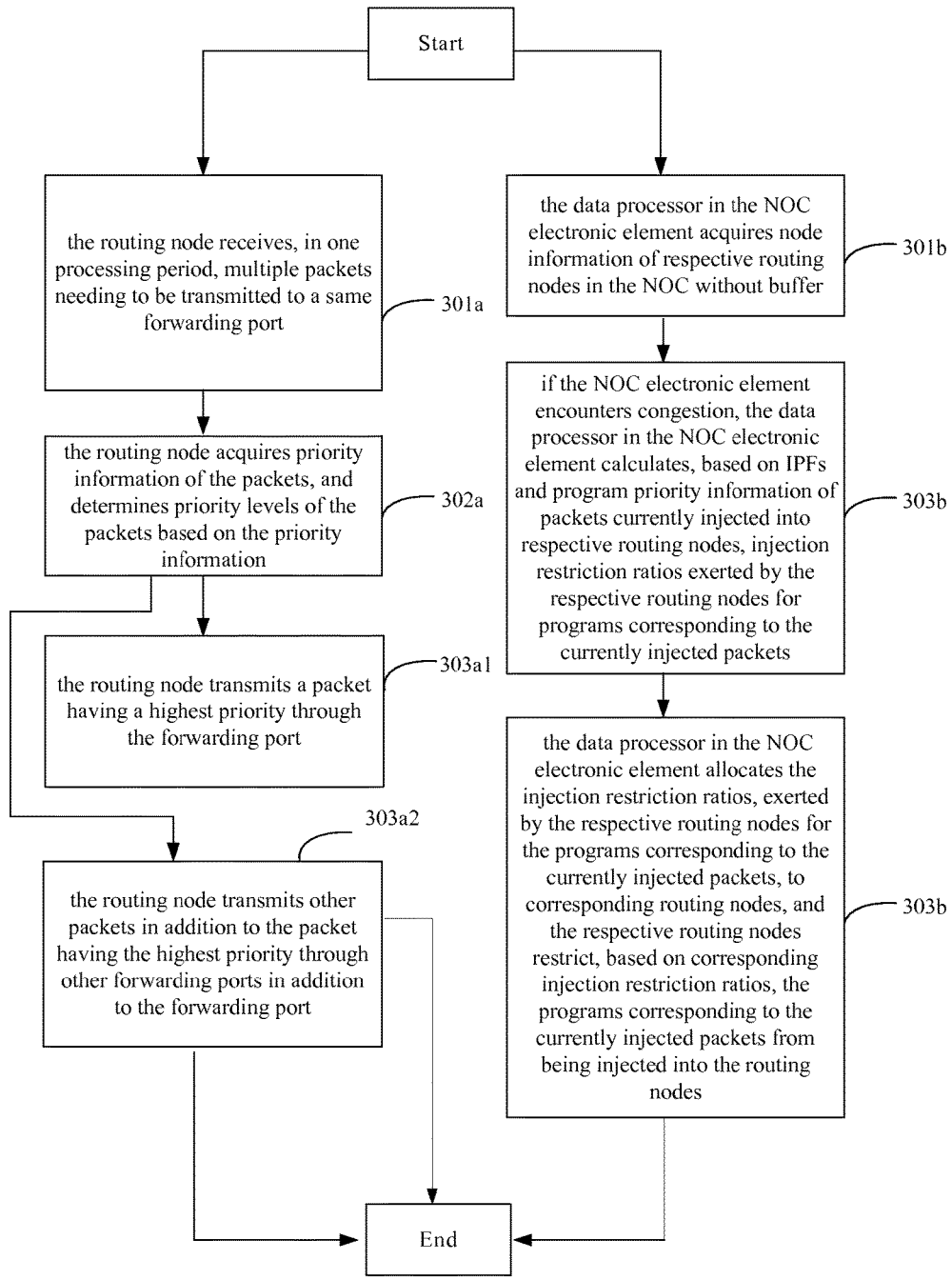
FIG. 5 is a schematic flow chart of a data processing method for an NOC without buffer according to an embodiment of the invention.

Based on the above, a data processing method for an NOC without buffer is provided according to an embodiment of the invention. For descriptions of technical terminologies and concepts related to the above embodiments, one may refer to the embodiments corresponding to FIGS. 2 and 3, which are not detailed herein. Specifically, the embodiment of the invention is applied to an NOC electronic element. The NOC electronic element includes at least one routing node and a data processor. The data processor may be a centralized controller in the NOC, or may be a CPU corresponding to any routing node in the NOC, or may be an independent calculation unit. Each routing node in the NOC includes one injection port configured to inject packets and multiple forwarding ports configured to forward packets to a network. As shown in FIG. 5, the data processing method for the NOC without buffer specifically includes the followings steps.

In a step 301a, the routing node receives, in one processing period, multiple packets needing to be transmitted to a same forwarding port.

In a step 302a, the routing node acquires priority information of the packets, and determines priority levels of the packets based on the priority information.

In a step 303a1, the routing node transmits a packet having a highest priority through the forwarding port.

In a step 303a2, the routing node transmits other packets in addition to the packet having the highest priority through other forwarding ports in addition to the forwarding port.

In a process of executing the step 301a to the step 303a1 or executing the step 301a to the step 303a2, the data processing method for the NOC without buffer further includes the followings steps.

In a step 301b, the data processor in the NOC electronic element acquires node information of respective routing nodes in the NOC without buffer.

In a step 302b, if the NOC electronic element encounters congestion, the data processor in the NOC electronic element calculates, based on IPFs and program priority information of packets currently injected into respective routing nodes, injection restriction ratios exerted by the respective routing nodes for programs corresponding to the currently injected packets.

The injection restriction ratio is a percentage of the program corresponding to the currently injected packet, which is restricted by the routing node from being injected into the routing node.

Optionally, a step 302b specifically includes the following step:

In a step 302b1, the data processor in the NOC electronic element determines, based on the IPFs and program priority information of the packets currently injected into the respective routing nodes and an injection restriction ratio formula, the injection restriction ratios exerted by the respective routing nodes for the programs corresponding to the currently injected packets.

The injection restriction ratio formula is $$T = \max\left(\delta, \frac{\lambda}{\alpha * IPF + \beta * \text{Priority}}\right),$$

where T represents the injection restriction ratio, Priority represents the program priority of the currently injected packet, and $\delta$, $\alpha$, $\beta$, $\gamma$ are constants.

Optionally, before the step 302*b*, the following step is further included:

In a step 302*b*2, the data processor in the NOC electronic element compares for each routing node the starving ratio of the routing node with a starving ratio threshold corresponding to the routing node, to determine whether the routing node encounters congestion.

If any routing node in the NOC electronic element encounters congestion, it is determined that the NOC without buffer encounters congestion.

In a step 303*b*, the data processor in the NOC electronic element allocates the injection restriction ratios, exerted by the respective routing nodes for the programs corresponding to the currently injected packets, to corresponding routing nodes, and the respective routing nodes restrict, based on corresponding injection restriction ratios, the programs corresponding to the currently injected packets from being injected into the routing nodes.

Exemplarily, the above steps 301*a* to 304*a*1 or to 304*a*2 describe a process that in one processing period the routing node allocates the forwarding ports for the respective packets transmitted to a same forwarding port; and the above steps 301*b* to 304*b* describe a process that in congestion of the NOC electronic element the data processor in the NOC electronic element exerts restrictions of different extents on the programs corresponding to the packets injected into the respective routing nodes, based on the congestion situation of the NOC electronic element and the program priorities of the programs corresponding to the packets injected into the respective routing nodes.

In the data processing method of the NOC without buffer according to the embodiment of the invention, with the process that the routing node in the NOC electronic element allocates the forwarding ports for the respective packets transmitted to a same forwarding port based on the program priorities of the packets, a packet having a high priority may have bigger chance of victory when the packet is injected into a routing node through the forwarding port, the time period during which a packet having a high program priority is remained in the NOC without buffer is shortened, and further, performance of a program having a high priority is improved by decreasing a ratio that the packets having the high program priority are deflected. In addition, if the NOC electronic element encounters congestion, the data processor in the NOC electronic element calculates, based on the node information of the respective routing nodes, the injection restriction ratios exerted by the respective routing nodes for the respective programs corresponding to the currently injected packets, and corresponds the respective routing nodes to the injection restriction ratios. Specifically, the injection restriction ratio for the program having the priority higher than the first preset threshold is lower than those for the program having the priority lower than the first preset threshold and the program having the IPF lower than the second preset threshold. Then, the calculated injection restriction ratios are respectively allocated to corresponding routing nodes, so that each routing node determines, based on the corresponding injection restriction ratio, whether to inject the respective packets of the program corresponding to the currently injected packet into the routing node. With the above process, when a routing node performs restriction on the packets of the program corresponding to the currently injected packet based on the allocated injection restriction ratio, packets of a program having a high priority are guaranteed to be injected into a routing node from a forwarding port as soon as possible since the injection restriction ratio corresponding to the program having the high priority is rather low. Hence, the packets of the program having the high priority are deflected for decreased number of times, an overall performance of the program having the high priority is improved, the transmission efficiency of the packets of the program having the high priority is improved, and the congestion of the NOC without buffer is alleviated.

Figure 6:
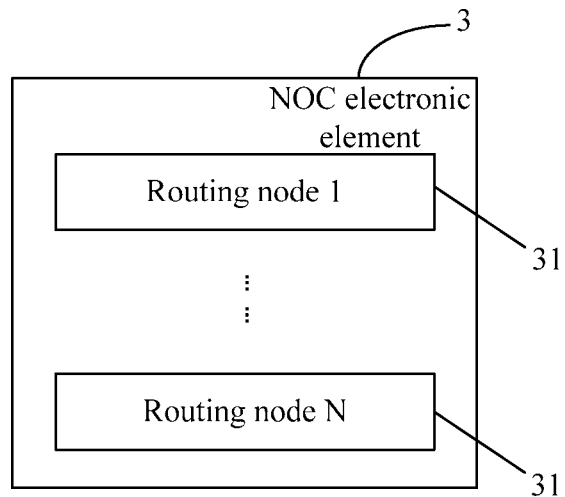
FIG. 6 is a schematic structure diagram of an NOC electronic element according to an embodiment of the invention.
Figure 7:
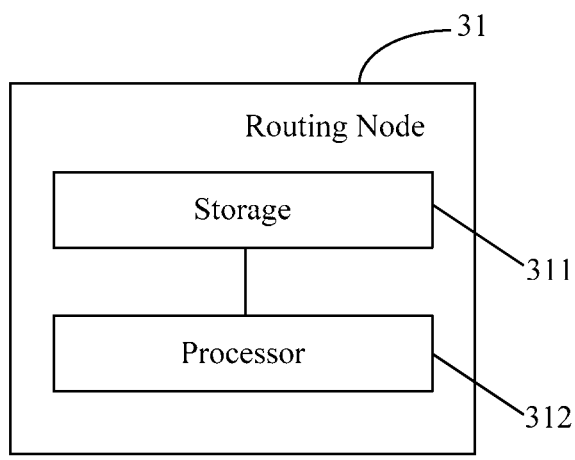
FIG. 7 is a schematic structure diagram of any routing node in an NOC electronic element according to an embodiment of the invention.

An NOC electronic element is provided according to an embodiment of the invention. As shown in FIG. 6, the NOC electronic element 3 includes at least one routing node 31. Specifically, as shown in FIG. 7 which is a schematic structure diagram of one routing node of the NOC electronic element, the routing node 31 includes: a storage 311, a processor 312, a switching unit, an input port and an output port. Functions of the processor and the storage are described as follows.

The storage 311 is configured to store a routing table, where a path along which a packet reaches a destination is recorded in the routing table.

The processor 312 is configured to receive, in one processing period, multiple packets needing to be transmitted to a same forwarding port; acquire priority information of the packets and determine priority levels of the packets based on the priority information, where the priority information includes time length information of the packet and program priority information of a program corresponding to the packet, the time length information of the packet represents a time period during which the packet is remained in the NOC; and transmit a packet having a highest priority through the forwarding port.

Optionally, the storage 311 is further configured to store a priority threshold.

When the processor 312 acquires the priority information of the packets and determines the priority levels of the packets based on the priority information, the processor 312 is specifically configured to acquire the priority information of the packets, acquire the priority threshold from the storage 311, and obtain the priority levels of the packets based on the priority information of the packets and the priority threshold.

Optionally, the processor 312 is further configured to, acquire, when a packet enters a first one of the routing nodes in the NOC, priority information corresponding to the packet from a register of a CPU corresponding to the first one of the routing nodes, and write the priority information corresponding to the packet into a head of the packet.

When the processor 312 acquires the priority information of the packets and determines the priority levels of the packets based on the priority information, the processor 312 is specifically configured to read the priority information corresponding to each packet from the head of the packet, and obtain the priority level of the packet based on the priority information of the packet.

Optionally, the processor 312 is further configured to transmit other packets in addition to the packet having the highest priority through other forwarding ports in addition to the forwarding port.

In the NOC electronic element according to the embodiment of the invention, the routing node receives, in one processing period, multiple packets needing to be transmitted to a same forwarding port, acquires the priority information of the packets and determines the priority levels of the packets based on the priority information, where the priority information includes the time length information of the packet and the program priority information of the program corresponding to the packet, the time length information of the packet represents the time period during which the packet is remained in the NOC; and the packet having the highest priority is forwarded through the forwarding port. Hence, a packet having a high priority may have bigger chance of victory when the packet is injected into a routing node through the forwarding port, the time period during which a packet having a high program priority is remained in the NOC without buffer is shortened, and further, performance of a program having a high priority is improved by decreasing a ratio that the packets having the high program priority are deflected.

Figure 8:
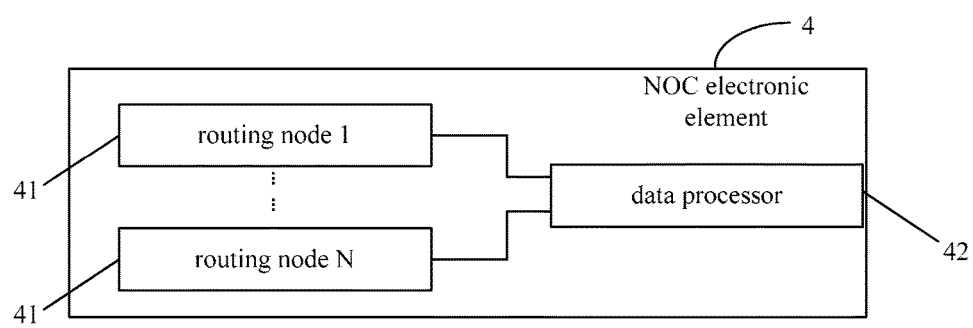
FIG. 8 is a schematic structure diagram of an NOC electronic element according to another embodiment of the invention.

An NOC electronic element is provided according to an embodiment of the invention. As shown in FIG. 8, the NOC electronic element 4 includes at least one routing node 41 and a data processor 42. The data processor 42 may be a centralized controller in the NOC, or may be a CPU corresponding to any routing node in the NOC, or may be an independent calculation unit. Each routing node 41 in the NOC includes an injection port configured to inject packets and multiple forwarding ports configured to forward packets to a network.

The data processor 42 is configured to acquire node information of each routing node 41 in the NOC electronic element 4 from the routing node 41 in the NOC electronic element 4.

The node information includes a starving ratio of the routing node 41, an IPF and program priority information of a program corresponding to a packet currently injected into the routing node 41. The program priority information is used to indicate a priority of the currently injected packet.

The data processor 42 is further configured to, if the NOC electronic element 4 encounters congestion, calculate, based on the IPF and the program priority information of the packet currently injected into each routing node 41, an injection restriction ratio exerted by each routing node 41 for the program corresponding to the currently injected packet.

The injection restriction ratio is a percentage of the program corresponding to the currently injected packet, which is restricted by the routing node 41 from being injected into the routing node.

The data processor 42 is further configured to allocate the injection restriction ratios, exerted by the respective routing nodes 41 for the programs corresponding to the currently injected packets, to corresponding routing nodes 41.

Each routing node 41 is configured to restrict, based on the corresponding injection restriction ratio allocated by the data processor 42, the program corresponding to the currently injected packet from being injected into the routing node 41.

Optionally, when the data processor 42 calculates, based on the IPF and the program priority information of the packet currently injected into each routing node 41, the injection restriction ratio exerted by each routing node 41 for the program corresponding to the currently injected packet, the data processor 42 is specifically configured to determine, based on the IPF and the program priority information of the packet currently injected into routing node 41 and an injection restriction ratio formula, the injection restriction ratio exerted by the each routing node 41 for the program corresponding to the currently injected packet.

The injection restriction ratio formula is $$T = \max\left(\delta, \frac{\lambda}{\alpha * IPF + \beta * \text{Priority}}\right),$$

where T represents the injection restriction ratio, Priority represents the program priority of the currently injected packet, and $\delta$, $\alpha$, $\beta$, $\gamma$ are constants.

Optionally, the data processor 42 determines whether the NOC electronic element 4 encounters congestion, based on the starving ratio of each routing node 41. Specifically, the data processor 42 compares, for each routing node 41, the starving ratio of the routing node 41 with a starving ratio threshold corresponding to the routing node 41, to determine whether the routing node 41 encounters congestion.

If any routing node 41 in the NOC electronic element 4 encounters congestion, it is determined that the NOC electronic element 4 encounters congestion.

Optionally, the node information of each routing node 41 in the NOC electronic element 4 is stored in a register of the routing node 41.

In the NOC electronic element according to the embodiment of the invention, if the NOC without buffer encounters congestion, the data processor in the NOC without buffer calculates, based on the IPFs and program priority information of the packets currently injected into the respective routing nodes, in the node information of the respective routing nodes, the injection restriction ratios exerted by the respective routing nodes for the programs corresponding to the currently injected packets. Specifically, the injection restriction ratio for a program having a priority higher than a first preset threshold is lower than those for a program having a priority lower than the first preset threshold and a program having an IPF lower than a second preset threshold. Then, the injection restriction ratios corresponding to the respective routing nodes are respectively allocated to corresponding routing nodes, and each routing node determines, based on the corresponding injection restriction ratio, whether to inject the respective packets of the program corresponding to the currently injected packet into the routing node. Hence, when a routing node performs restriction on the packets of the program corresponding to the currently injected packet based on the allocated injection restriction ratio, packets of a program having a high priority are guaranteed to be injected into a routing node from a forwarding port as soon as possible since the injection restriction ratio corresponding to the program having the high priority is rather low. Hence, the packets of the program having the high priority are deflected for decreased number of times, an overall performance of the program having the high priority is improved, the transmission efficiency of the packets of the program having the high priority is improved, and the congestion of the NOC without buffer is alleviated.

Figure 9:
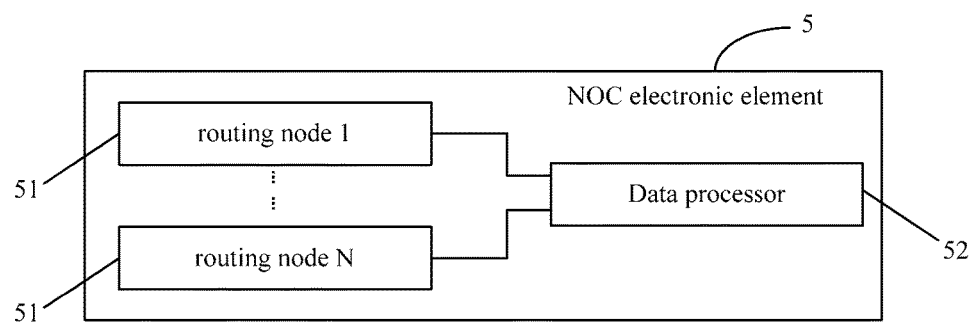
FIG. 9 is a schematic structure diagram of an NOC electronic element according to yet another embodiment of the invention.

An NOC electronic element is provided according to an embodiment of the invention. As shown in FIG. 9, the NOC electronic element 5 includes at least one routing node 51 and a data processor 52. Each routing node 51 includes an injection port configured to inject packets from outside to the routing node 51 and at least one forwarding port configured to forward packets to a network from the routing node 51. The data processor 52 may be a centralized controller in the NOC, or may be a CPU corresponding to any routing node in the NOC, or may be an independent calculation unit.

The routing node 51 in the NOC electronic element 5 is configured to, receive, in one processing period, multiple packets needing to be transmitted to a same forwarding port; acquire priority information of the packets and determine priority levels of the packets based on the priority information, where the priority information includes time length information of the packet and program priority information of a program corresponding to the packet, the time length information of the packet represents a time period during which the packet is remained in the NOC; and transmit a packet having a highest priority through the forwarding port.

The data processor 52 is configured to acquire node information of each routing node 51 in the NOC electronic element 5 from the routing node in the NOC electronic element 5. The node information includes a starving ratio of the routing node 51, an IPF and program priority information of a program corresponding to a packet currently injected into the routing node 51. The program priority information is used to indicate a priority of the currently injected packet. The data processor 52 is further configured to determine whether the NOC electronic element 5 encounters congestion based on the starving ratio of each routing node 51; and if the NOC electronic element 5 encounters congestion, the data processor 52 is further configured to calculate, based on the IPF and the program priority information of the packet currently injected into each routing node 51, an injection restriction ratio exerted by each routing node 51 for the program corresponding to the currently injected packet. The injection restriction ratio is a percentage of the program corresponding to the currently injected packet, which is restricted by the routing node 51 from being injected into the routing node 51. The data processor 52 is further configured allocate the injection restriction ratios, exerted by the respective routing nodes 51 for the programs corresponding to the currently injected packets, to corresponding routing nodes 51.

Each routing node 51 in the NOC electronic element is further configured to restrict, based on the corresponding injection restriction ratio allocated by the data processor 52, the program corresponding to the currently injected packet from being injected into the routing node 51.

Optionally, the routing node 51 is further configured to transmit other packets in addition to the packet having the highest priority through other forwarding ports in addition to the forwarding port.

Optionally, when the routing node 51 acquires the priority information of the packets and determines the priority levels of the packets based on the priority information, the routing node 51 is specifically configured to acquire the priority information of each packet and a priority threshold, and determine the priority level of each packet based on the priority information of the packet and the priority threshold.

Optionally, the routing node 51 is further configured to, acquire, when a packet enters a first one of the routing nodes in the NOC, priority information corresponding to the packet from a register of a CPU corresponding to the first one of the routing nodes, and write the priority information corresponding to the packet into a head of the packet.

When the routing node 51 acquires the priority information of the packets and determines the priority levels of the packets based on the priority information, the routing node 51 is specifically configured to read the priority information corresponding to each packet from the head of the packet, and obtain the priority level of the packet based on the priority information of the packet.

Optionally, when the data processor 52 calculates, based on the IPF and the program priority information of the packet currently injected into each routing node 51, the injection restriction ratio exerted by each routing node 51 for the program corresponding to the currently injected packet, the data processor 52 specifically determines, based on the IPF and the program priority information of the packet currently injected into each routing node 51 and an injection restriction ratio formula, the injection restriction ratio exerted by the each routing node 51 for the program corresponding to the currently injected packet. The injection restriction ratio formula is $$= \max\left(\delta, \frac{\lambda}{\alpha * IPF + \beta * \text{Priority}}\right),$$

where T represents the injection restriction ratio, Priority represents the program priority of the currently injected packet, and δ, α, β, γ are constants.

Optionally, when the data processor determines whether the NOC electronic element encounters congestion based on the starving ratio of each routing node 51, the data processor is specifically configured to compare, for each routing node 51, the starving ratio of the routing node 51 with a starving ratio threshold corresponding to the routing node 51, to determine whether the routing node 51 encounters congestion.

If any routing node 51 in the NOC electronic element 5 encounters congestion, it is determined that the NOC electronic element 5 encounters congestion.

Optionally, the node information of each routing node 51 in the NOC electronic element 5 is stored in a register of the routing node 51.

In the NOC electronic element according to the embodiment of the invention, with the process that the routing node in the NOC electronic element allocates the forwarding ports for the respective packets transmitted to a same forwarding port based on the program priorities of the packets, a packet having a high priority may have bigger chance of victory when the packet is injected into a routing node through the forwarding port, the time period during which a packet having a high program priority is remained in the NOC without buffer is shortened, and further, performance of a program having a high priority is improved by decreasing a ratio that the packets having the high program priority are deflected. In addition, if the NOC electronic element encounters congestion, the data processor in the NOC electronic element calculates, based on the node information of the respective routing nodes, the injection restriction ratios exerted by the respective routing nodes for the respective programs corresponding to the currently injected packets, and corresponds the respective routing nodes to the injection restriction ratios. Specifically, the injection restriction ratio for a program having a priority higher than a first preset threshold is lower than those for a program having a priority lower than the first preset threshold and a program having an IPF lower than a second preset threshold. Then, the calculated injection restriction ratios are respectively allocated to corresponding routing nodes, so that each routing node determines, based on the corresponding injection restriction ratio, whether to inject the respective packets of the program corresponding to the currently injected packet into the routing node. With the above process, when a routing node performs restriction, based on the allocated injection restriction ratio, on the packets of the program corresponding to the currently injected packet, packets of a program having a high priority are guaranteed to be injected into a routing node from a forwarding port as soon as possible since the injection restriction ratio corresponding to the program having the high priority is rather low. Hence, the packets of the program having the high priority are deflected for decreased number of times, an overall performance of the program having the high priority is improved, the transmission efficiency of the packets of the program having the high priority is improved, and the congestion of the NOC without buffer is alleviated.

It is clear for those skilled in the art that the above division of function modules is illustrated for a convenient and brief description. In practice, the above functions can be achieved by different functional modules as required, i.e., the device may be divided into different functional modules for implementing all or some of the above functions. Detailed working process of the described system, device and units may be referred to corresponding working process in the foregoing method embodiments, and is not repeated herein.

It should be understood that, according to the embodiments of the invention, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

The units described as separate components may be or not be separated physically. The components shown as units may either be or not be physical units, i.e., the units may be located at one place or may be distributed onto multiple network units. All of or part of the units may be selected based on actual needs to implement the solutions according to the embodiments of the invention.

In addition, individual function units according to the embodiments of the invention may be integrated in one processing unit, or the units may exist separately, or two or more units may be integrated in one unit. The integrated unit may be implemented in the form of hardware or software function unit.

If the functions are implemented in the form of software function unit and the software function unit is sold or used as separate products, the software function unit may also be stored in a computer readable storage medium. Based on such understanding, the technical solutions of the disclosure, part of the disclosure that contributes to existing technologies or part of the technical solutions may be embodied in the form of a computer software product. The computer software product is stored in a storage medium and includes several instructions for instructing a computer device (which may be personal computer, server, network device or the like) to implement all of or part of the steps of the methods according to the embodiments of the invention. The foregoing storage medium includes various media that can store program codes, for example, USB disk, mobile hard disk drive, Read-Only Memory (ROM), Random Access Memory (RAM), magnetic disk, optical disk and the like.

Those above embodiments are merely intended to explain the technical solutions of the invention, rather than to limit the invention. Although the invention is detailed in conjunction with the foregoing embodiments, it should be understood by those skilled in the art that, modifications may be made to the technical solutions according to the foregoing embodiments, or some technical features in the embodiments may be replaced with equivalents. Those modifications and equivalents would not make related technical solutions depart from the spirit and scope of the technical solutions according to the embodiments of the present invention.

What is claimed is:

1. A method for forwarding packets between routing nodes, comprising:
   receiving, by a processor included in a routing node in a non-buffered network on chip (NOC), a plurality of packets in one processing period, wherein each packet of the plurality of packets is allocated to a same forwarding port of the routing node;
   acquiring, by the processor, for each packet in the plurality of packets, priority information of the packet;
   acquiring a pre-stored priority threshold;
   determining, by the processor, for each packet in the plurality of packets, a priority level of the packet based on the priority information of the packet and the priority threshold, wherein for each packet in the plurality of packets, the priority information comprises time length information of the packet and program priority information of a program corresponding to the packet, wherein the time length information of the packet represents an amount of time during which the packet has remained in the non-buffered NOC and forwarded among the routing nodes in the non-buffered NOC, and the program priority information corresponds to a priority of the program corresponding to the packet; and
   forwarding, by the processor based on the priority levels of the packets in the plurality of packets, a packet among the plurality of packets having a highest priority level through the forwarding port to another routing node in the non-buffered NOC.

2. The method according to claim 1, wherein before acquiring, for each packet in the plurality of packets, the priority information of the packet, the method further comprises:
   acquiring, when a packet enters a first one of the routing nodes in the non-buffered NOC, priority information corresponding to the packet from a register of a processor included in the first one of the routing nodes, and writing the priority information corresponding to the packet into a head of the packet; and
   wherein acquiring the priority information of the plurality of packets and determining the priority levels of the packets based on the priority information comprises:
   reading the priority information corresponding to the packets from the heads of the packets, and obtaining the priority levels of the packets based on the priority information of the packets.

3. The method according to claim 1, wherein after determining the packet having the highest priority among the plurality of packets to be transmitted to the forwarding port, the method further comprises:
   forwarding other packets in addition to the packet having the highest priority through other forwarding ports in addition to the forwarding port.

4. The method according to claim 2, wherein after determining the packet having the highest priority among the plurality of packets to be transmitted to the forwarding port, the method further comprises:
   forwarding other packets in addition to the packet having the highest priority through other forwarding ports in addition to the forwarding port.

5. A method for forwarding packets among routing nodes, comprising:
   acquiring, by a processor included in a network on chip (NOC) network element, node information of each routing node in the NOC electronic element, wherein the node information for each routing node comprises a starving ratio of the routing node, a quantity of instructions per flit (IPF) for each packet of a program corresponding to a packet currently injected into the routing node, and program priority information indicating a priority of the currently injected packet;
   calculating, by the processor, based on the IPFs and the program priority information of the packets currently injected into respective routing nodes, injection restriction ratios exerted by respective routing nodes for the programs corresponding to the currently injected packets when the NOC electronic element encounters congestion, wherein the injection restriction ratio is a percentage of the program corresponding to the currently injected packet that is restricted by the routing node from being injected into the routing node;

allocating, by the processor, the injection restriction ratios, exerted by respective routing nodes for the programs corresponding to the currently injected packets, to corresponding routing nodes, wherein each routing node restricts, based on the corresponding injection restriction ratio, the program corresponding to the currently injected packet from being injected into the routing node when routing packets among the routing nodes in the NOC electronic element;

comparing, for each routing node, the starving ratio of the routing node with a starving ratio threshold corresponding to the routing node to determine whether the routing node encounters congestion; and determining that the NOC electronic element encounters congestion when any routing node in the NOC electronic element encounters congestion.

6. The method according to claim 5, wherein calculating the injection restriction ratios comprises:

determining, based on the IPFs and the program priority information of the packets currently injected into the respective routing nodes and an injection restriction ratio formula, the injection restriction ratios exerted by the respective routing nodes for the programs corresponding to the currently injected packets, wherein the injection restriction ratio formula is $$T = \max\left(\delta, \frac{\lambda}{\alpha * IPF + \beta * \text{Priority}}\right),$$

wherein T represents the injection restriction ratio, Priority represents a program priority of the currently injected packet, and $\delta, \alpha, \beta, \lambda$ are constants.

7. A routing node in a non-buffered network on chip (NOC), the routing node comprising:
a storage,
a processor,
wherein the storage is configured to store a routing table, wherein a path along which a packet reaches a destination is recorded in the routing table;
wherein the processor is configured to, receive, in one processing period, a plurality of packets allocated to be transmitted to a same forwarding port, acquiring a pre-stored priority threshold, acquire priority information of the plurality of packets, and determine priority levels of the plurality of packets based on the priority information and the priority threshold, and transmit, based on the priority levels of the plurality of packets, a packet having a highest priority through the same forwarding port to another routing node in the non-buffered NOC; and
wherein, for each packet, the priority information comprises time length information of the packet and program priority information of a program corresponding to the packet, and the time length information of the packet represents an amount of time during which the packet has remained in the non-buffered NOC and forwarded among the routing nodes in the non-buffered NOC, and the program priority information corresponds to a priority of the program corresponding to the packet.

8. The routing node according to claim 7, wherein:
the storage is further configured to store the priority threshold; and
wherein the processor acquires the priority threshold from the storage.

9. The routing node according to claim 7, wherein:
the processor is further configured to, acquire, when a packet enters a first one of the at least one routing node in the non-buffered NOC, the priority information corresponding to the packet from a register of a processor included in the first one of the at least one routing node, and write the priority information corresponding to the packet into a head of the packet; and
when the processor acquires the priority information of the plurality of packets and determines the priority levels of the plurality of packets based on the priority information, the processor is further configured to read the priority information corresponding to each packet from the head of the packet, and obtain the priority level of the packet based on the priority information of the packet.

10. The routing node according to claim 7, wherein the processor is further configured to forward other packets in addition to the packet having the highest priority through other forwarding ports in addition to the same forwarding port.

11. The routing node according to claim 8, wherein the processor is further configured to forward other packets in addition to the packet having the highest priority through other forwarding ports in addition to the same forwarding port.

12. The routing node according to claim 9, wherein the processor is further configured to forward other packets in addition to the packet having the highest priority through other forwarding ports in addition to the same forwarding port.

13. A network on chip (NOC) electronic element, comprising:
at least two routing nodes, wherein each routing node of the at least two routing nodes comprises an injection port and at least one forwarding port; and
a data processor, configured to:
acquire node information of each routing node in the NOC electronic element, wherein the node information comprises a starving ratio of the routing node, a quantity of instructions per flit (IPF) for each packet of a program corresponding to a packet currently injected into the routing node, and program priority information indicating a priority of the currently injected packet;
in response to the NOC electronic element encountering congestion, calculate, based on the IPFs and the program priority information of the packets currently injected into respective routing nodes, injection restriction ratios exerted by the respective routing nodes for the programs corresponding to the currently injected packets, wherein the injection restriction ratio is a percentage of the program corresponding to the currently injected packet that is restricted by the routing node from being injected into the routing node;
allocate the injection restriction ratios, exerted by respective routing nodes for the programs corresponding to the currently injected packets, to corresponding routing nodes;
compare, for each routing node, the starving ratio of the routing node with a starving ratio threshold corresponding to the routing node, to determine whether the routing node encounters congestion; and determine that the NOC electronic element encounters congestion if any routing node in the NOC electronic element encounters congestion;

wherein each routing node is configured to restrict, based on the corresponding injection restriction ratio allocated by the data processor, the program corresponding to the currently injected packet from being injected into the routing node when routing packets among the at least two routing nodes in the NOC electronic element.

14. The NOC electronic element according to claim 13, wherein when the data processor calculates, based on the IPFs and the program priority information of the packets currently injected into respective routing nodes, the injection restriction ratios exerted by the respective routing nodes for the programs corresponding to the currently injected packets, the data processor is further configured to determine, based on the IPFs and the program priority information of the packets currently injected into the respective routing nodes and an injection restriction ratio formula, the injection restriction ratios exerted by the respective routing nodes for the programs corresponding to the currently injected packets, wherein the injection restriction ratio formula is $$T = \max\left(\delta, \frac{\lambda}{\alpha * IPF + \beta * \text{Priority}}\right),$$

where T represents the injection restriction ratio, Priority represents a program priority of the currently injected packet, and $\delta$, $\alpha$, $\beta$, $\lambda$ are constants.

15. The NOC electronic element according to claim 13, wherein, for each routing node, the node information of the routing node in the NOC electronic element is stored in a register of the routing node.

16. The NOC electronic element according to claim 14, wherein, for each routing node, the node information of the routing node in the NOC electronic element is stored in a register of the routing node.

* * * * *